United States Patent

Burtin et al.

[11] Patent Number: 5,939,993
[45] Date of Patent: Aug. 17, 1999

[54] METHOD FOR DEVELOPING A HIGH VOLTAGE AND DEVICE FOR ELECTROSTATIC COATING PRODUCT SPRAYING

[75] Inventors: Jean-Pierre Burtin, Saint-Egreve; Flavien Dobrowolski, Sinard, both of France

[73] Assignee: Sames S.A., Meylan, France

[21] Appl. No.: 08/677,537

[22] Filed: Jul. 10, 1996

[30] Foreign Application Priority Data

Jul. 10, 1995 [FR] France .................................. 95 08622

[51] Int. Cl.⁶ .................................................. G08B 21/00
[52] U.S. Cl. .......................... 340/662; 340/664; 340/635; 361/212; 361/228
[58] Field of Search ..................... 340/662, 664, 340/663, 657, 635; 324/511, 522; 361/233, 212, 228 R

[56] References Cited

U.S. PATENT DOCUMENTS 3,764,883 10/1973 Stand et al. .
4,203,142 5/1980 Lee .............................................. 361/42
4,402,030 8/1983 Moser et al. .
4,737,887 4/1988 Thome .
4,862,364 8/1989 Matsuda .............................. 364/424.01
5,138,513 8/1992 Weinstein .................................... 361/2

FOREIGN PATENT DOCUMENTS 0219409 4/1987 European Pat. Off. .
2532127 2/1984 France .
0532859 2/1973 Switzerland .
2115243 9/1983 United Kingdom .

Primary Examiner—Jeffery A. Hofsass
Assistant Examiner—Julie B. Lieu
Attorney, Agent, or Firm—Pillsbury Madison & Sutro

[57] ABSTRACT

A method and device for monitoring the production of a high voltage for use in electrostatic application of a coating product, the high voltage being produced by a generator and the monitoring being performed by a circuit for measuring an electrical parameter associated with the high voltage, together with verifying operation of the circuit immediately following start-ups of the generator.

20 Claims, 2 Drawing Sheets

METHOD FOR DEVELOPING A HIGH VOLTAGE AND DEVICE FOR ELECTROSTATIC COATING PRODUCT SPRAYING

BACKGROUND OF THE INVENTION

The present invention relates to an apparatus for electrostatic spraying of a coating product such as, for example, paint, and concerns more particularly an improvement which prevents the creation of electric arcs that can represent a real danger when the coating product contains volatile and flammable ingredients.

An electrostatic spraying apparatus includes, in particular, a mobile sprayer furnished with a high voltage electrode and arranged to create an electric field between the high voltage electrode and the object to be coated, the latter being connected to electrical ground, and to disperse the coating product. In order to do this, the spraying apparatus comprises, in addition to the electrode, means for supplying the coating product, a medium, such as air, for entraining the coating product and electric energy. The sprayer is thus connected to a stationary supply and control unit by a bundle of electric cables and various conduits. The electric energy is almost always supplied in the form of a direct high voltage of the order of 50–150 kV, which is applied to the electrode. The resulting electric current, including that carried by the flow of charged coating product particles and ions created or transported through the atmosphere under the influence of the electric field, is of the order of 50–200 $\mu$A. Several techniques have been proposed for applying the high voltage to the sprayer electrode.

The high voltage can be applied directly to the electrode from a high voltage generator located in the supply and control unit which is disposed at a distance from the sprayer and thus from the electrode. The generator encompasses components for converting alternating current energy supplied by the power supply mains into a high dc voltage. The supply bundle mentioned above then necessarily comprises a high voltage cable enclosed in a suitably designed high voltage insulating sheath.

It is also possible to supply a very low direct current voltage, of the order of several tens of volts, to the sprayer if the sprayer contains a cascade arrangement of a high frequency amplifier which is fed with this low dc voltage, a step-up transformer producing a medium level high frequency voltage of the order of several kV, and a conventional rectifier-voltage multiplier assembly, composed of capacitors and diodes, for transforming the medium level high frequency voltage into a high dc voltage, this high voltage being applied to the electrode or electrodes. In this case, the supply and control unit contains only a step-down transformer and a rectifier to convert the low ac voltage from the supply mains into a very low dc voltage. The previously mentioned supply bundle then includes conductors which do not have substantial insulation for transporting the dc current to the oscillator.

It has also been proposed to place only the transformer and the rectifier-voltage multiplier assembly in the sprayer. The oscillator is then disposed at a distance from the sprayer in the supply and control unit. In this case, the supply bundle carries an ac signal at very low voltage and at high frequency. The present invention, which will be described below, is particularly applicable to such an arrangement, even though the principle of the invention can be applied to other systems comprising a current supply for a high voltage electrode.

The electric arcs observed during operation of such installations can have various causes:

Regardless of the nature of the device utilized, it can occur that the distance between the high voltage electrode of the sprayer and the workpiece to be coated, which is at ground potential, becomes insufficient to withstand the high dc voltage;

If the high voltage is developed at a distance from the sprayer, a fault in the high voltage cable insulation can also give rise to electric arcs;

On the other hand, if the high voltage is developed in the sprayer, the bundle carries a relatively high current, of the order of several amperes, and a break in the conductor or a poor connection contact is capable of provoking an electric arc due to the energy stored in the circuit inductance.

Various systems have been proposed for counteracting the formation of electric arcs. These known systems are distinguished from one another on the basis of the type of electric arc which it is desired to eliminate and according to the quantity being monitored.

French Patent Application No. A-2158031 discloses monitoring the values of the electric current at the output of a high voltage transformer and cutting off the supply of the high voltage generator when the value of the current exceeds a threshold. U.S. Pat. No. 4,737,887 proposes monitoring variations with respect to time of the alternating current circulating in the conductor connecting the low voltage unit to the rectifier-voltage multiplier of a generator. One problem in monitoring systems of this type resides in the fact that in the event of a failure of the monitoring system, a potentially dangerous operating state, i.e. capable of leading to the creation of electric arcs, cannot be detected. The monitoring loop is not completely reliable.

Similarly, U.S. Pat. No. 4,402,030 proposes to measure variations of the current in the high voltage circuit of the generator but does not permit detecting poor operation of the control circuit. In particular, the detection of potentially dangerous situations is inhibited during starting of the generator.

SUMMARY OF THE INVENTION

It is a basic object of the present invention to resolve the above problems in a simple and economical manner.

Objects according to the invention are achieved by a method for monitoring the production of a high voltage for use in electrostatic application of a coating product, the high voltage being produced by a generator and the monitoring being performed by a circuit for measuring an electrical parameter associated with the high voltage, the method comprising verifying operation of the circuit immediately following start-ups of the generator.

The invention enables verification of proper operation of the loop to take place at numerous times during the operation of an electrostatic coating installation. In effect, whether it is a question of a manual or automatic installation, it is the usual practice to interrupt and reinitiate the high voltage several times during coating of an object, for example when the painter releases the trigger of the manual paint sprayer and then presses the trigger anew, or when the automatic sprayer encounters a part of the workpiece which is not to be coated, such as a window opening in the body of an automotive vehicle, and then passes in front of a part to be coated such as a door panel.

The physical quantity which is measured can be the electric current which must have a non-zero value at the time of starting of the device. According to a particularly advantageous embodiment of the invention, the measured variations are the variations with respect to time of an electric current flowing through the high voltage generating device. This current has a value of zero when the device is halted. It has a non-zero value after start-up of the device. Thus, each start-up of the device generates a distinct current variation, this variation being detectable by systems known in the prior art. The process of the invention includes a step of verification that the detection loop distinctly "sees" a current variation at the time of each start-up. If such detection does not occur, the detection loop is not functioning correctly and an alarm or a cutoff of the supply of low voltage to the generator is triggered.

The invention also concerns a device for performing the process, and more specifically a device for electrostatic spraying of a coating product, which device comprises a high voltage generator and a loop for detecting a potentially dangerous situation by measurement of a physical quantity or of its variations with respect to time, characterized in that it comprises means for verifying the function of the detection loop.

The invention will be better understood and other advantages thereof will appear more clearly from the description which follows of an embodiment of a device for electrostatic spraying of a coating product according to the principle of the invention, which description is given solely by way of a non-limiting example, with reference to the attached drawings.

DESCRIPTION OF THE PREFERRED EMBODIMENTS

Figure 1:
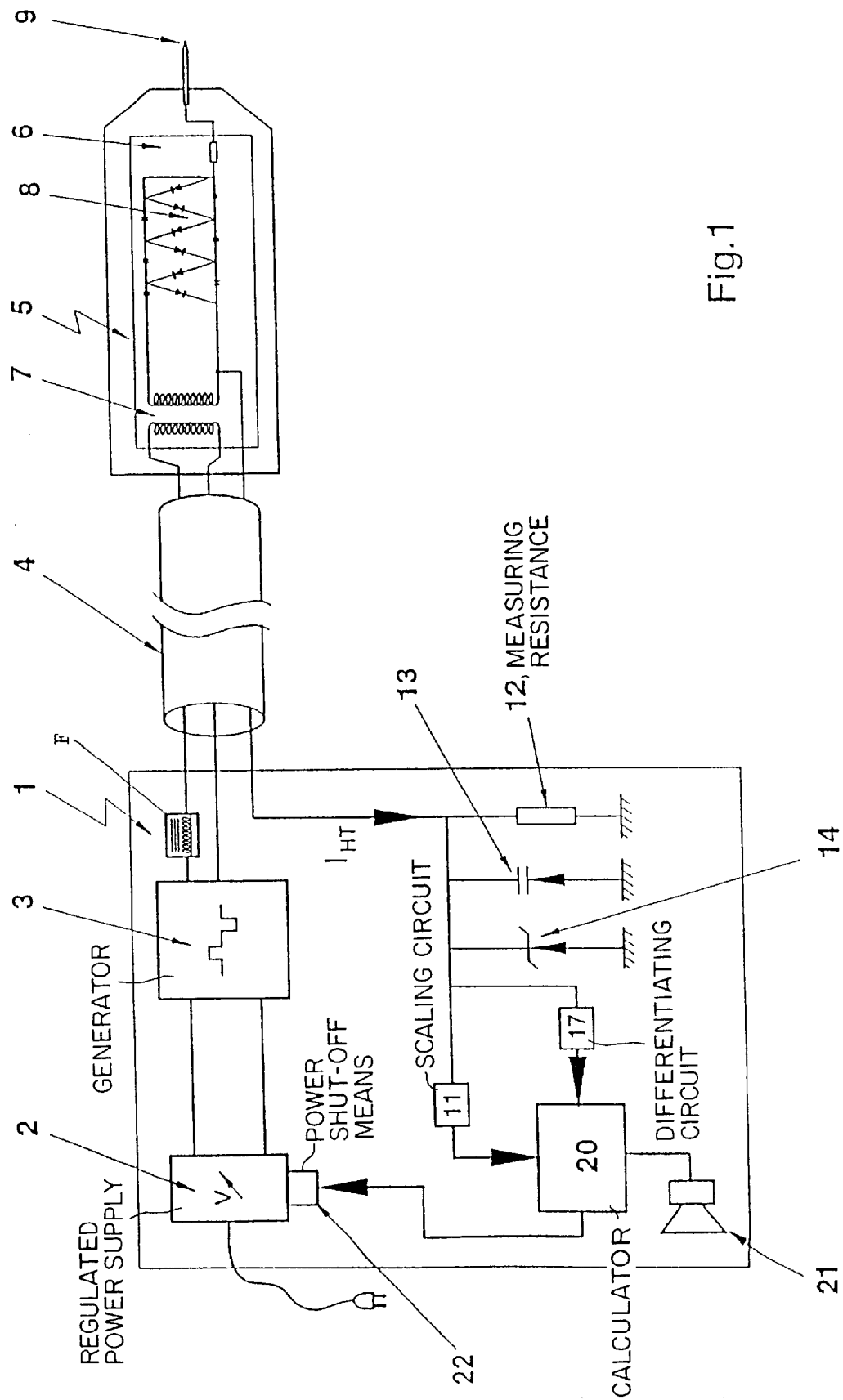
FIG. 1. is a schematic diagram of an embodiment of a high voltage generator according to the invention.

In the circuit shown in FIG. 1, a low voltage unit 1 is constituted essentially by a regulated power supply 2 connected to the power supply mains and supplying a direct current at an adjustable direct voltage to a generator 3 which is operative to produce an alternating current having an adjustable frequency, f. The regulated power supply 2 can also have as its power source a storage battery or any other power source. The periodic electric signal generated by generator 3 in low voltage unit 1 is a square wave signal having a constant waveform which minimizes first order harmonics, i.e. a wave which is as close as possible to a perfect sinusoid.

A filter F permits partial smoothing of this signal. The amplitude of the signal produced by generator 3 is variable as a function of the amplitude of the voltage applied by power supply 2 to generator 3. Although the waveform of the signal described here above is particularly advantageous and simple to produce, any other periodic signal could be employed in the practice of the present invention, and in particular a true sinusoidal signal.

The periodic signal produced by the low voltage unit 1 is applied through a bundle 4 of flexible conductive cables to the inlet of a coating product sprayer 5 which is installed in a spray booth (not shown). The sprayer is supplied with coating product and spraying air in a manner which is known per se and which is not illustrated. Sprayer 5 comprises a voltage increasing rectifier-step-up transformer 6 which comprises an input transformer 7 and a voltage multiplier 8. The output of the voltage multiplier 8 is connected to a high voltage electrode 9.

The current $I_{HT}$ in the secondary winding of transformer 7 is measured with the aid of an electric conductor forming part of the bundle of cables 4 and connected to the input of a scaling circuit 11. Scaling circuit 11 is thus connected to receive a signal representative of $I_{HT}$ from an input stage composed of a parallel arrangement of a measuring resistance 12, a capacitor 13 for filtering out high voltage components of the current and a voltage limiting diode 14. The output of circuit 11 is connected to the input of a calculator 20. Scaling circuit 11 contains a conventional current-voltage converter which outputs a voltage proportional to the value of $I_{HT}$ and which places the output voltage in a range, e.g., 0 to 5V, compatible with the input range of calculator 20. In addition, a time differentiation circuit 17 is connected between the input of circuit 11 and another input of calculator 20.

Figure 2:
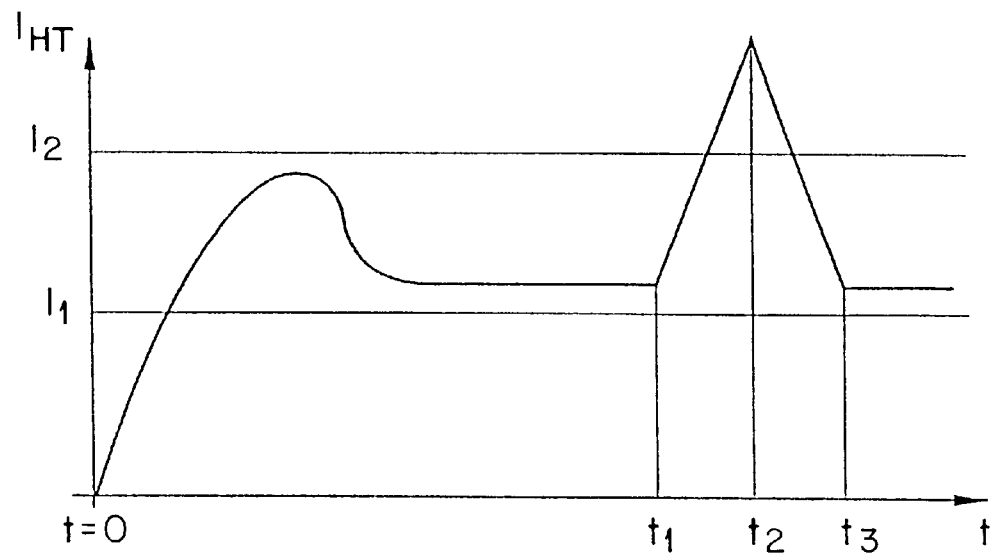
FIG. 2 is a waveform diagram depicting the current in the secondary of the high voltage transformer of the embodiment of FIG. 1.
Figure 3:
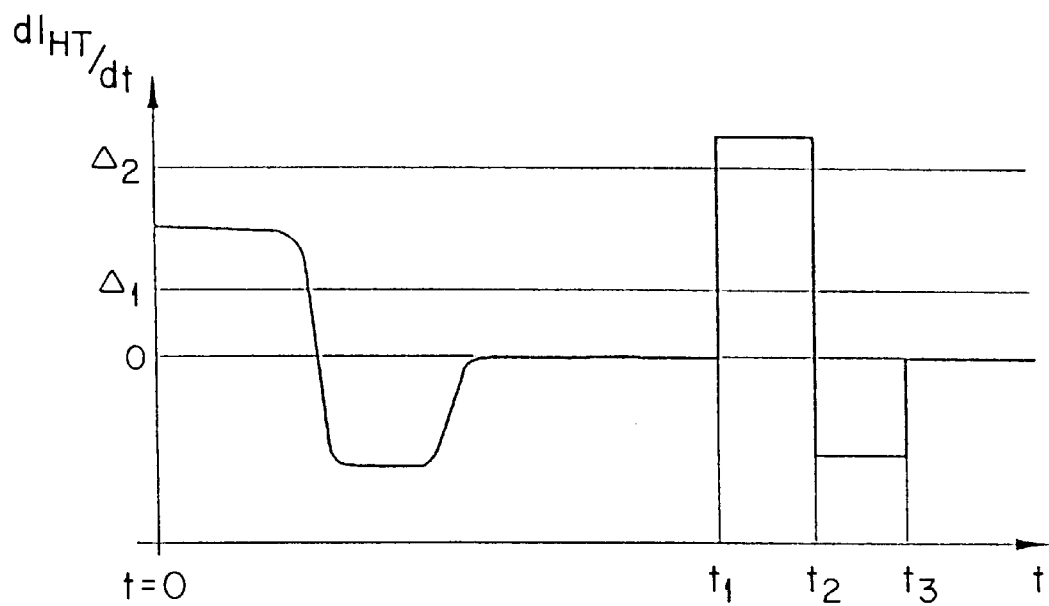
FIG. 3 is a waveform diagram depicting variations with respect to time of the current shown in FIG. 2.

Development of the current $I_{HT}$ with respect to time is shown in FIG. 2. It is measured in the unit formed by circuit 11, components 12, 13 and 14 and calculator 20. If operation of the circuit begins at a time t=0, i.e., low voltage unit 1 is turned on, the current rises from a value of 0 up to a maximum limit value and then decreases to an assigned, or nominal, value, or a value close thereto. If at a moment $t_1$ an object at ground potential approaches electrode 9, the current increases substantially and a dangerous situation can arise. If the object begins to move away from electrode 9 beginning at a time $t_2$, the current decreases until the time $t_3$, where it returns to the nominal value. Calculator 20 is constructed to trigger an alarm 21 or a power shut-off means 22 when the value of the current $I_{HT}$ is greater than an experimentally fixed value $I_2$.

In a similar manner, when operation of the circuit begins at the time t=0, the value of $dI_{HT}/dt$ produced by differentiation circuit 17 is first positive and then negative and then assumes a value of 0 when the current has stabilized. Starting at time $t_1$, and continuing until time $t_2$, $dI_{HT}/dt$ has a positive value, and then between times $t_2$ and $t_3$, it has a negative value. After time $t_3$, this quantity again has a 0 value when the current has returned to its nominal value. Calculator 20 is arranged to control alarm 21 or means 22 for cutting off, or inhibiting operation of, power supply 2 when the value of $dI_{HT}/dt$ becomes greater than an experimentally determined value $\Delta_2$ at any time.

According to the invention, calculator 20 is further adapted to detect the values of the current $I_{HT}$ and its variation $dI_{HT}/dt$ during each startup, i.e. shortly after time t=0. In effect, it is known that the value of the current must necessarily exceed a value of $I_1$, which is experimentally determined, during a time interval corresponding to the establishment of a steady state. The duration of this time interval is determined experimentally; it can, for example, vary between 100 ms and 1 second. In practice, $I_1$ can be fixed to a fraction of the steady state, or nominal value, for example 70% of that value. Calculator 20 is adapted to drive the alarm 21 or the cut-off means 22 for the power supply 2 when the value of the current $I_{HT}$ remains below $I_1$ during the period for establishment of the steady state. Thus, the operation of the detection loop is verified during each startup: if a current $I_{HT}$ greater than $I_1$ is detected during the predetermined time interval, it is assumed that the loop is functioning correctly; if a current greater than $I_1$ is not detected at any time during the period in question, it is concluded that the loop is not functioning correctly.

In the same manner, according to the invention, the calculator is adapted to verify that during each startup, the value for $dI_{HT}/dt$ is indeed non-zero, i.e. greater than an experimentally determined value $\Delta_1$. In practice, $\Delta_1$ can correspond to a fraction of $\Delta_2$, for example 20% thereof. Thus, the operation of the detection loop is verified during each startup: if a value of $dI_{HT}/dt$ greater than $\Delta_1$ is detected, one can assume that the loop is functioning correctly; if no variation greater than $\Delta_1$ is detected, the loop does not function correctly.

These verifications are used during each startup of the device, i.e. each time that the value of the high voltage passes from a zero value to a non-zero value, which guarantees a large number of verifications during a workday. An eventual malfunction is thus detected without delay.

The verification could also be based on the value of the high voltage $U_{HT}$ created in the sprayer 5, i.e. between electrode 9 and circuit ground, or based on either the current or the voltage supplied to generator 3, or on any other physical quantity representative of the operation of the device, and in particular representative of the high voltage current.

One can note that the invention permits detection of improper operation of each of the components 12, 13 and 14 and/or the circuits 11 and 17. It can even permit detection of a malfunction of the calculator 20 if provision is made to activate the alarm 21 or the shut-off means 22 by default, i.e. on a fail-safe basis, unless the signals produced at the outputs of calculator 20, based on measurements of $I_{HT}$ and of $dI_{HT}/dt$ have suitable values.

Of course, the invention is applicable to measurement of only one of the two quantities used in the embodiment shown in FIG. 1, i.e. either the current or variations in the current with respect to time.

The invention has been described with reference to an embodiment in which the low voltage unit 1 is separated from the rectifier-step-up transformer 5 and is connected thereto by a bundle 4 of flexible cables. However, the invention can also be applied to any of the types of generators mentioned in the initial part of this specification.

This application relates to subject matter disclosed in Application number 95 08622, filed on Jul. 10, 1995 in France, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. In a method for monitoring the production of a high voltage for use in electrostatic application of a coating product, the high voltage being produced by a generator and the monitoring being performed by a circuit for measuring an electrical parameter associated with the high voltage, the improvement comprising verifying operation of the circuit immediately following a startup of the generator, said verifying step comprising producing an indication of improper functioning of the circuit when the electrical parameter has a value which remains below a first given value during a time period following each startup.

2. The method according to claim 1 wherein the high voltage produces a current and the electrical parameter is one of the magnitude of the current and the time rate of change of the magnitude of the current.

3. The method according to claim 1 wherein the electrical parameter is a current.

4. The method according to claim 1 wherein the electrical parameter is a voltage.

5. The method according to claim 1 wherein the verifying step produces an indication when the value of the electrical parameter exceeds a second given value which is greater than the first given value.

6. The method according to claim 5 wherein the high voltage produces a current and the current is the electrical parameter.

7. The method according to claim 5 wherein the high voltage produces a current and the electrical parameter is the time differential of the current.

8. The method according to claim 1 wherein said step of verifying is performed during a period that begins at each startup.

9. The method according to claim 1 wherein said step of verifying is performed after each startup and before the high voltage reaches a steady state value.

10. A device for electrostatic spraying of a coating product, said device comprising: a generator for producing a high voltage to be used during electrostatic spraying, said generator being switchable between an inactive state in which no high voltage is produced and an active state in which the high voltage is produced; a circuit for monitoring the high voltage, in order to detect the occurrence of a potentially dangerous condition, by monitoring an electrical parameter associated with the high voltage; and verification means connected for verifying operation of said circuit upon switching of said generator from the inactive state to the active state by producing an indication of improper function of said circuit when the electrical parameter has a value which remains below a first given value for a period of time following switching of said generator from the inactive state to the active state.

11. The device according to claim 10 wherein said verification means are activated following each start-up of said device.

12. The device according to claim 10 wherein said generator comprises a low voltage unit and a step-up transformer connected to receive a current from said low voltage unit, and the electrical parameter is the magnitude of current from said step-up transformer.

13. The device according to claim 10 wherein said generator comprises a low voltage unit and a step-up transformer connected to receive current from said low voltage unit, and the electrical parameter is the magnitude of the high voltage, which is produced by said generator to a high voltage electrode.

14. The device according to claim 10 further comprising an alarm connected to said verification means.

15. The device according to claim 10 further comprising a shut-off means connected to said verification means.

16. The device according to claim 10 wherein said verification means produces an indication when the value of the electrical parameter exceeds a second given value which is greater than the first given value.

17. The device according to claim 16 wherein the high voltage produces a current and the current is the electrical parameter.

18. The device according to claim 16 wherein the high voltage produces a current and the electrical parameter is the time differential of the current.

19. The device according to claim 10 wherein said verification means verify operation of said circuit during a period that begins at each startup.

20. The device according to claim 10 wherein said verification means verify operation of said circuit during each startup and before the high voltage reaches a steady state value.

* * * * *